Nov. 17, 1942.   R. S. ELBERTY, JR   2,302,304
SPEED CONTROL MECHANISM
Filed Oct. 17, 1940   3 Sheets-Sheet 1
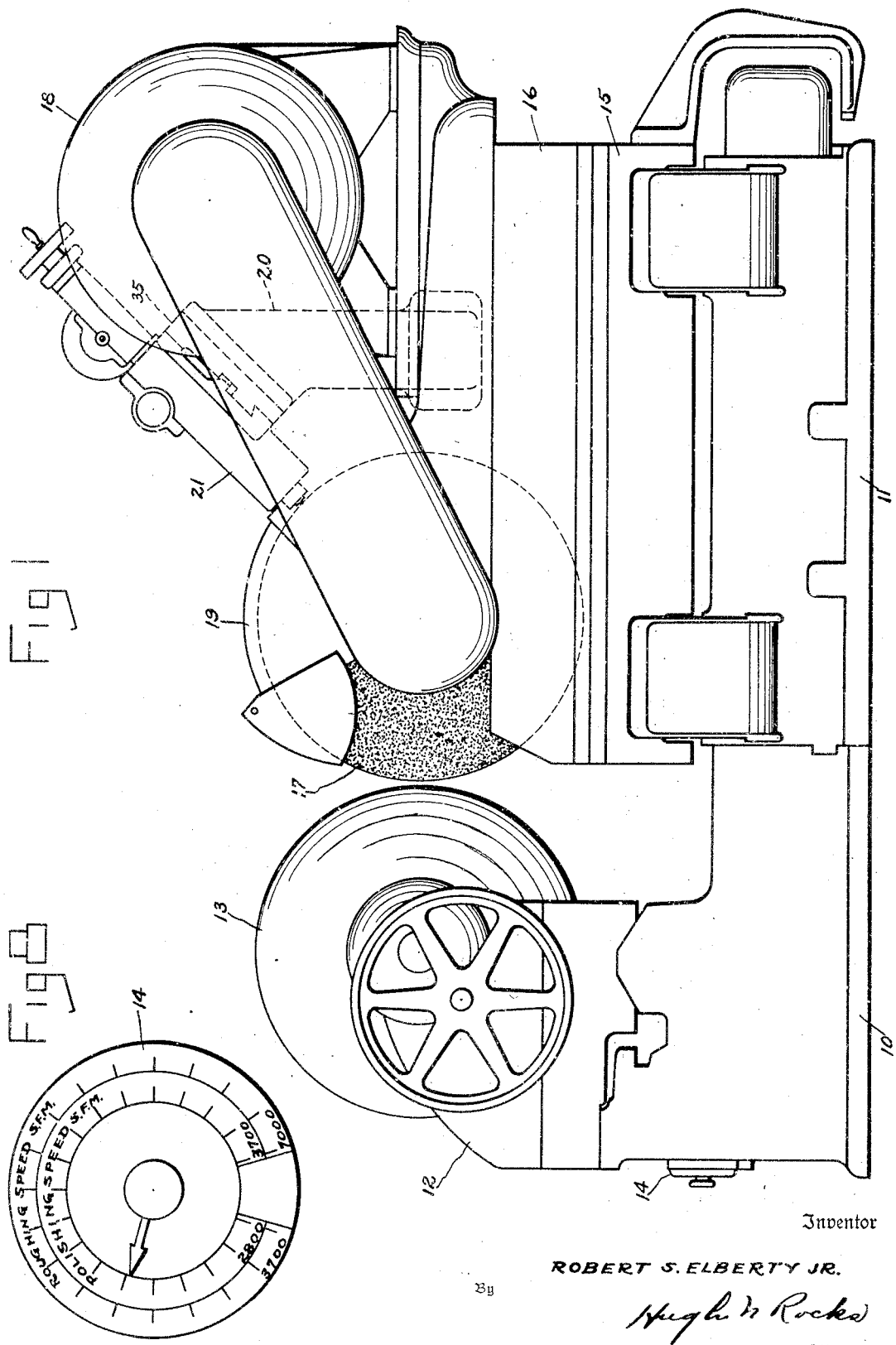
Inventor
ROBERT S. ELBERTY JR.
By
Hugh N Rocks
Attorney

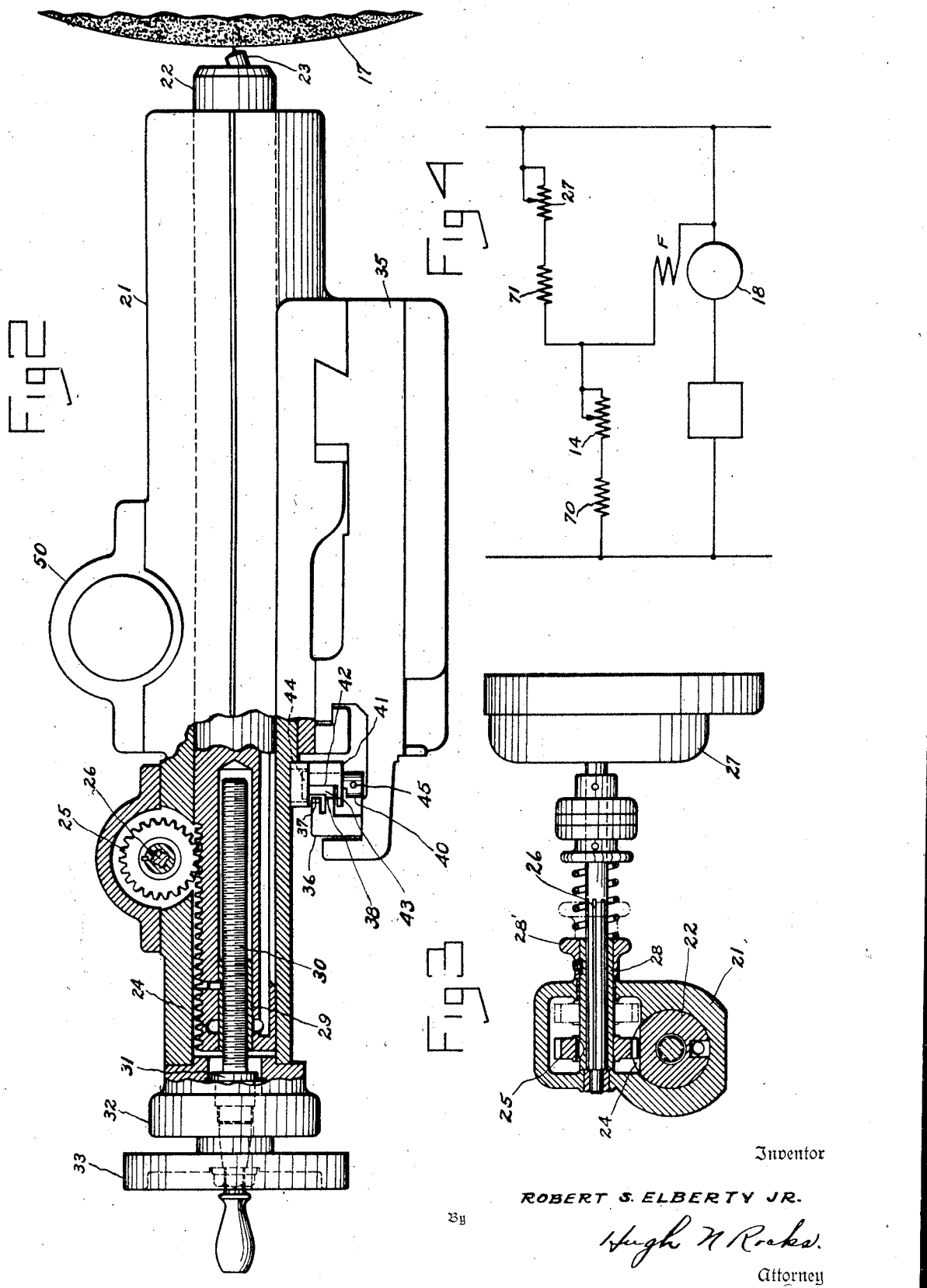

Nov. 17, 1942.   R. S. ELBERTY, JR   2,302,304
SPEED CONTROL MECHANISM
Filed Oct. 17, 1940    3 Sheets-Sheet 3
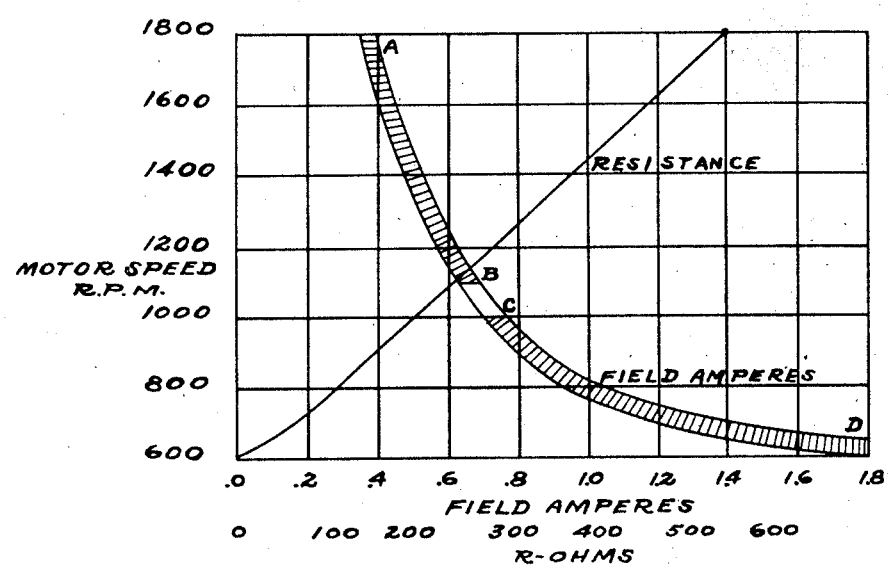
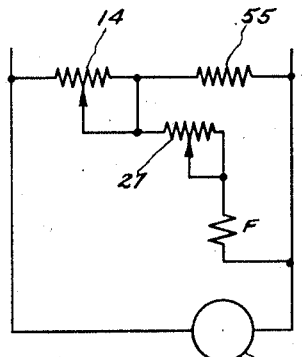
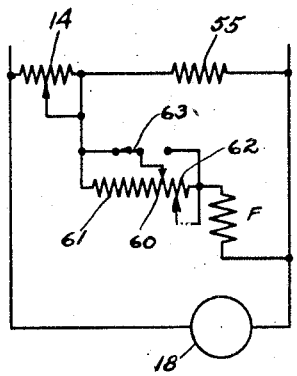
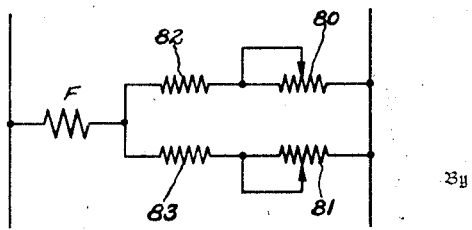
Inventor
ROBERT S. ELBERTY JR.
By
Hugh N. Rochen
Attorney Patented Nov. 17, 1942

2,302,304

UNITED STATES PATENT OFFICE 2,302,304

SPEED CONTROL MECHANISM

Robert S. Elberty, Jr., Waynesboro, Pa., assignor to Landis Tool Company, Waynesboro, Pa.

Application October 17, 1940, Serial No. 361,535

7 Claims. (Cl. 51—166)

This application is a continuation in part of my pending application Serial No. 203,668, filed April 22, 1938, and the invention disclosed herein relates to speed control mechanisms for use where the relation between angular speed and peripheral speed of a tool or work piece or other object is constantly changing.

An object of the invention is to provide a speed control mechanism for adjusting the angular speed of a rotating member so that the selected peripheral speed may be maintained substantially constant as the diameter of the rotating member changes.

A further object of the invention is to provide a speed control mechanism of the above type wherein the speed of a driving member is so controlled and modified as to maintain the peripheral speed of a driven member substantially constant as the diameter of the driven member decreases.

A further object is to provide an electrical circuit for an electric motor whereby the speed of said motor may be adjusted by increments which are a fixed percentage of the preceding speed.

A particular object of my invention is to provide a speed control device for a grinding wheel whereby any peripheral speed may be selected by means of an adjustable resistance in the wheel drive motor circuit, and the selected speed maintained substantially constant by another adjustable resistance which is connected to a wheel dressing device so as to increase the motor speed as the wheel becomes smaller.

In the drawings:

Figure 1 is an end elevation of a grinding machine.

Figure 2 is a left end elevation of the dressing mechanism partly in section.

Figure 3 is a front elevation partly in section showing the connection between the dresser feed and the adjustable resistance for controlling the wheel drive motor.

Figure 4 is a wiring diagram showing one type of circuit for the use of two adjustable resistances.

Figure 5 is a wiring diagram showing an improved type of circuit for use with two adjustable resistances.

Figure 6 is a diagram of a circuit having means for varying the range of peripheral speeds.

Figure 7 is a curve showing the relation between motor speed, field current and resistance in the field.

Figure 8 is a front elevation of the adjusting resistance.

Figure 9 is an optional circuit for selecting and maintaining wheel speeds.

In the past, speed control devices for grinding wheels had a single means for varying speed, either a rheostat, a cone pulley, or some other suitable device. Many of these were connected in some way to the wheel fender and as the wheel became worn the fender was shifted and the speed varying means was changed to increase the speed of the wheel. The range of such a speed changing device whether mechanical or electrical was limited by the characteristics of the driving motor or by the bulk of the mechanical device.

Attempts have been made using two rheostats in series to provide a means for selecting any peripheral speed and then maintaining that speed constant as the wheel became smaller, or for selecting any peripheral speed not knowing the diameter of the wheel or its angular speed. These failed because they did not take into account the fact that the regulating rheostat in such a combination will function properly for only one selected surface speed. A greater change in motor speed is necessary to maintain a constant peripheral speed when a 24" wheel wears two inches than when a 36" wheel wears the same amount, and a rheostat will, unless modified, give the same change in motor speed for a given increment of resistance. Of course, the surface speed may be changed by means of an adjusting resistance, but if the wheel is partly worn there is no way of determining quickly what the new surface speed is, and it is impossible to maintain any selected speed constant. Any given range on a regulating resistance corresponds to a given number of R. P. M. change of motor speed and a given change in wheel size. For a certain surface speed this might be all right but another surface speed would require a different change in R. P. M. for a given change in diameter of wheel. What is required is a fixed percentage of motor speed change for each increment of change in the diameter of the wheel rather than a change of a fixed number of revolutions. That is, for each given increment of resistance, the change in motor speed should be a fixed percentage of the preceding speed. Applicant has found that this result may be obtained within close limits by using a circuit wherein two adjustable resistances, another resistance and the motor field are connected in series multiple relation. One of the adjustable resistances serves to select any of a plurality of peripheral speeds, the other to regulate the motor speed as conditions may require to maintain the peripheral speed constant.

This invention is an improvement over previous devices in that it provides means for setting the motor control for a given peripheral speed of the grinding wheel and additional means for maintaining said speed substantially constant as the wheel wears down.

Another feature of my invention lies in a double use of the resistance for selecting the peripheral speed of the grinding wheel whereby suitable speeds may be obtained for either polishing or grinding. Assuming that at the initial position of the regulating resistance, the wheel dresser is in position to dress a 36 inch wheel, and the adjusting resistance has been set for a predetermined peripheral speed, successive dressing of the wheel will result in the dresser being advanced to position to engage a 24 inch wheel. In its initial position the regulating resistance will have no influence on the wheel speed. The initial speed will be determined by the setting of the adjusting resistance which is graduated in feet per minute peripheral speed. Obviously each graduation corresponds to the R. P. M. of the motor which will result in that particular surface speed on a 36 inch wheel. When the wheel has been reduced to 24 inches the dresser will have been shifted six inches with a corresponding change in the regulating resistance which has functioned to progressively increase the R. P. M. of the motor and wheel so that the surface speed of the 24 inch wheel is still the same as was that of the 36 inch wheel. However, the change in R. P. M. by the adjustable resistance 14 for a given change in peripheral speed will be different for wheels of different diameters. At this point a 24 inch polishing wheel may be substituted for the grinding wheel on the machine, and since a polishing wheel requires a much slower surface speed than a grinding wheel, the relation of the regulating resistance to the dresser must be changed either by disconnecting and turning the resistance back to a point of no resistance, or by the use of a switch to cut out all resistance which has been inserted up to this point. In order to set the peripheral speed of this wheel the polishing scale on the adjusting resistance must be referred to. Any speed thus selected will be maintained the same as for the larger wheel. Also, the peripheral speed of the grinding wheel may be changed a definite amount at any time regardless of the size of the wheel by means of the adjusting resistance.

While I have illustrated my invention as applied to a grinding machine, I do not limit it to such use. When a grinding wheel is being dressed the wheel becomes the work piece and the dresser becomes the tool. The equivalent of this is the operation of facing off a large disk on a lathe or similar machine where it is desired to maintain a constant work speed at the point of engagement between work and tool. There are numerous other uses for my invention; for example in unwinding material from a reel or spool, it is often desirable to drive the spool at a changing rate so that the material may move at a substantially constant rate. My invention may be applied to such apparatus with little or no difficulty. As applied to electrical apparatus, my invention is not limited to speed control thru the motor field, but may be used with any form of adjustable resistance. Obviously the invention is a device for selecting and controlling surface speed of one member of a machine relative to the position of another member where such surface speeds vary depending upon the diameter of the member at the point where the speed is measured.

In Figure 1 is shown an end view of a grinding machine, in this case a roll grinder. Numeral 10 indicates a front bed section, and 11 a rear bed section. On the front section is mounted a footstock 12 supporting one end of a roll 13. An adjustable resistance 14 is mounted at the front of the bed section 10. On the rear bed section 11 is mounted a slidable carriage 15 and on said carriage is mounted a wheel support 16 slidable transversely of the carriage. A grinding wheel 17 is rotatably mounted in wheel support 16 and driven by motor 18. A wheel guard or fender 19 surrounds wheel 17. To the rear of said fender is a bracket 20 mounted on said wheel support and having slidably mounted thereon a wheel dressing mechanism.

Said mechanism may be shifted by any suitable means for the purpose of traversing the dressing tool across the grinding wheel. The wheel dressing mechanism, Figure 2 and Figure 3, consists of a housing 21, having a cylindrical bore therein, and a diamond bar 22 slidably mounted in said bore. A diamond tool 23 is mounted in one end of said bar. Rack teeth 24 are cut in the other end and mesh with a pinion 25 on one end of a shaft 26. The rotor of an adjustable resistance 27 is attached to the other end of said shaft. Between said shaft and said pinion is mounted a sleeve 28 which is slidable on said shaft. Pinion 25 is secured to said sleeve, a knob 28' on said sleeve makes it possible to shift the pinion manually into and out of contact with said rack teeth so that the relation of the adjustable resistance to the position of the diamond bar may be adjusted.

The rack end of bar 22 is bored out to receive a sleeve 29. Said sleeve is threaded internally to receive a screw 30. A shoulder 31 on said screw bears against cap 32 which is secured to and closes the open end of housing 21. From said shoulder an extended portion passes thru said cap. A handwheel 33 is secured in any suitable manner to the extended portion of screw 30. While a manually operated feed mechanism is disclosed, it is obvious that any suitable power operated means, either manually or automatically controlled, may be used.

Housing 21 is slidably mounted on a base 35 on bracket 20. A forming bar 36 is secured to a portion of said base and has a curved surface 37 and a straight surface 38 spaced one above the other. A plunger 40 is slidably mounted in a guide member 41 which in turn is secured to the underside of housing 21. A portion of said guide member is cut away at 42 to permit engagement between forming bar 36 and a follower surface 43 on plunger 40. Said plunger may be shifted to place said follower in operative relation to either of the surfaces on the forming bar. A head 44 limits the downward movement of said plunger while a pin 45 limits the upward movement thereof.

A bracket 50 houses a back lash mechanism of any suitable construction which also serves to hold plunger 40 in contact with forming bar 36.

In the circuit shown in Figure 5, a resistance 55 is placed in the field circuit in series with the adjusting resistance 14 and in parallel with the regulating resistance 27. The purpose of the resistance is to act as a bleeder and to cause the regulating resistance to effect a difference in speed which is a fixed percentage of the preceding speed rather than a fixed number of revolutions when the adjustable resistance 14 is cut into the circuit or when it is set for any speed. This circuit has been found to give the best results.

The values of adjustable resistances 14 and 27 and resistance 55 can be calculated to give a very close approximation of the required speed range when the motor characteristics are known. This is done by selecting the values of 14, 27 and 55 to meet conditions indicated on motor curve as points A, B, C and D. For example, consider a motor having a field resistance $R_f$ of 130 ohms and a speed range of 600–1800 R. P. M. In the circuit shown in Figure 5, $R_{14}$ is the resistance value of resistance 14, $R_{27}$ the value of adjustable resistance 27, and $R_{55}$ the value of resistance 55. With my device, a given range of speeds corresponds to a given change in diameter of the grinding wheel. In this case the adjustable resistance 27 is connected to the dressing tool which must be advanced in order to dress the wheel as the wheel becomes smaller. The value $R_{27}$ of this resistance increases as the wheel becomes smaller. With adjustable resistance 14 cut out, resistance 55 has no effect since full voltage is then applied directly to adjustable resistance 27. For a 36 inch wheel, for example, the dresser would be in such a position that adjustable resistance 27 would also be cut out. The motor 18 would therefore be running at its slowest speed, in this case 600 R. P. M. By suitable pulleys, the desired speed of the grinding wheel can be obtained at this motor speed. As the wheel wore down to 22 inches, the dressing tool would be advanced and the adjustable resistance 27 shifted so that the motor would be running at 990 R. P. M. From Figure 7 the manufacturer's curve for this particular motor, we find that for a speed of 990 R. P. M., an external resistance value of 190 ohms is required. Therefore, the value of adjustable resistance 27 or $R_{27}$ is 190 ohms. By cutting in all of $R_{14}$ at this time, the maximum speed of the motor, 1800 R. P. M., may be obtained. With $R_{14}$ all in the circuit and $R_{27}$ all out, the motor speed will be 1100 R. P. M., $I_f$ will be .636 amp., $E_f$ 83 volts. Under these conditions the voltage drop across resistance 55 will also be 83 volts. These figures may all be obtained from the motor characteristic as disclosed by the manufacturers' curve and the application of Ohm's law thereto. The voltage drop $ER_{14}$ across the adjustable resistance 14 under the above conditions would be the difference between the line voltage, 230, and the voltage drop across the field, 83, or 147. From Ohm's law:

$$\frac{\frac{R_{14}}{1}}{\frac{1}{R_{55}}+\frac{1}{130}}=\frac{147}{83}$$

or (A) $130\, R_{14}+R_{14}R_{55}-232\, R_{55}=0$.

When both resistances are cut in, that is, with $R_{27}$ equal to 190 ohms for 1800 R. P. M., the manufacturers' motor characteristic curve indicates that the current thru the field $I_f$ will be .35 amp., the drop across the field $E_f$, 45 volts, the drop across $R_{27}$, 67 volts. The voltage drop across $R_{55}$ under these conditions should be equal to the sum of these voltages, that is, 45 plus 67 or 112 volts. The drop across $R_{14}$ at this time would be 230 minus 112 or 118 volts. According to Ohm's law:

$$\frac{\frac{R_{14}}{1}}{\frac{1}{R_{55}}+\frac{1}{190-130}}=\frac{118}{112}$$

or (B) $320\, R_{14}+R_{14}R_{55}-337\, R_{55}=0$.

Equation A minus Equation B is $190\, R_{14}-105\, R_{55}=0$.

Therefore $R_{55}=1.81\, R_{14}$.

Substituting this value of $R_{14}$ in either of the Equations A or B, gives a value of 160 ohms and therefore $R_{55}$ is equal to $1.81\times160$ or 290 ohms. By following the above procedure the values of resistances 14, 27 and 55 may be determined for any motor. It has been determined that the total resistance in the circuit of Figure 5 may be expressed as follows:

$$R_t = R_{14}+R_{14}\left(\frac{R_{27}+R_f}{R_{55}}\right)+R_{27}$$

A typical motor curve having the points A, B, C and D indicated thereon is disclosed in Figure 7. This figure shows graphically the relation between motor speed, resistance and field current for a given motor. The portions A—B and C—D show the speed range of the motor for extreme positions of adjustable resistance 14. It will be noted that the variation in motor speed for a given change in resistance is proportionally greater at the lower speeds than at the higher speeds.

Figure 4 discloses another type of circuit for obtaining the desired regulation and adjustment. This figure consists of two adjustable resistances 14 and 27, one of which is in series with the field, and one of which is in parallel with the field. A resistance 70 is inserted in the circuit ahead of resistance 14. Its function is to make adjusting resistance 27 effective when resistance 14 is cut out and to modify said resistance 27 at other times. Another resistance 71 is inserted in the circuit just ahead of resistance 27. Its function is to keep sufficient resistance in the field circuit when $R_{27}$ is at a minimum so that the motor will not run away.

The objects of this invention may be attained more or less satisfactorily by using any of a number of electrical circuits the resistances of which would have to be calculated in a manner similar to that disclosed herein. For example, in Figure 9 is shown a circuit wherein the controlling resistances are in series with the field and in parallel with each other. Each of the parallel circuits consists of an adjustable resistance 80 and 81 respectively and another resistance 82 or 83 respectively inserted ahead of said adjustable resistances. Resistance 82 prevents resistance 81 from becoming inoperative when resistance 80 is zero. Resistance 83 prevents resistance 80 from becoming inoperative when resistance 81 is zero. The circuits shown in Figures 4, 5 and 9 all have one thing in common, that is, they are all series multiple circuits including the motor field, two adjustable resistances and additional resistance which may or may not be adjustable.

The circuit disclosed in Figure 6 is identical with that shown in Figure 5, except that an adjustable resistance 60 is substituted for adjustable resistance 27. Adjustable resistance 60 has two ranges 61 and 62 and a switch 63 to shift from one range to the other. The same result might be accomplished by using two independent resistances with a switch to change from one to the other. Figure 6 shows switch 63 in position to cut out portion 61 of adjustable resistance 60. When the contactor of the resistance is at the beginning of portion 62 the dressing tool is in position to dress a 23 or 24 inch wheel. For adjusting the peripheral speed of this size wheel the polishing scale on adjustable resistance 27 should be used. As the polishing wheel is reduced in size from 24 inches the resistance contactor is moved by the adjustment of the diamond across portion 62 of said resistance and the R. P. M. of the wheel is increased sufficiently to maintain the desired surface speed.

Operation

Before starting the machine the operator must decide what wheel speed is necessary and adjust resistance 14 for this speed. Adjusting diamond 23 to a point in line with the surface of the wheel will shift adjustable resistance 27 to cause motor 18 to run at the proper speed to provide the predetermined peripheral speed for the wheel on the machine. As the grinding proceeds, the dresser must be operated from time to time in order to maintain a satisfactory cutting surface on the wheel, and as the wheel wears down the dresser must be advanced by means of handwheel 33 and screw 30. This movement of bar 22 is transmitted by rack 24, pinion 25 and shaft 26 to adjustable resistance 27. This adjustment of resistance 27 is effective to increase gradually the resistance in the field circuit of motor 18 as the dressing tool is advanced progressively to reach the surface of the grinding wheel. This increases the motor speed to compensate for the reduction in diameter of the wheel due to wear and dressing. The increase in motor speed is proportional to the reduction in wheel size, increasing the R. P. M. of the wheel and thereby maintaining a constant peripheral speed.

If it becomes necessary to change the peripheral speed of the wheel, adjustable resistance 14 is adjusted for the desired speed and adjustable resistance 27 continues to be adjusted automatically by the movement of the dresser bar to maintain the new desired peripheral speed. However, for each increment of resistance added by the resistance 27 as the dressing tool is adjusted, the motor speed changes by a different number of R. P. M. than with the previous setting of resistance 14. For low values of $R_{14}$, resistance in series with F will vary directly as $R_{27}$ is varied. This corresponds to the low or polishing speed range of the wheel speed control. For a high value of $R_{14}$ corresponding to the high or grinding speed range of the control, the voltage drop across $R_{14}$ is influenced by the current in $R_{55}$ as well as the current in $R_{27}$. The effective resistance in series with F will therefore vary at a greater rate than the variation in $R_{27}$ as $R_{27}$ is varied. The resistors $R_{14}$, $R_{27}$, and $R_{55}$ can be selected so that this rate of effective resistance variation is proportioned to the setting of $R_{14}$ which will furnish the same range of speed control at the high speed settings as at the low speed settings for the same movement of $R_{27}$.

For polishing it is desirable to use wheels of not larger than 24 inches and the peripheral speed of the wheels for this purpose is roughly about half that used for grinding. Ordinarily, when a wheel has been worn to 24 inches the diamond bar 22 is advanced to a point where the adjustable resistance 27 would cause the motor 18 to run at a speed of about 1,000 R. P. M. However, when polishing, a wheel of this diameter would require a motor speed of about 600 R. P. M. In order to set adjustable resistance 27 to give a motor speed of 600 R. P. M. with a 24 inch wheel, it is necessary to disconnect said resistance from the diamond bar by withdrawing knob 28' to shift pinion 25 out of engagement with rack 24. Said adjustable resistance is then turned back to a point where enough resistance is cut out to provide the desired speed. Pinion 25 is then shifted to engage rack 24 again. As the wheel is reduced from this size and the diamond bar advanced, the adjustable resistance 27 will increase the motor speed so as to maintain the slower peripheral speed. This change in the range of peripheral speed of grinding wheels may be accomplished electrically by means of the circuit shown in Figure 6, and described above.

I claim:

1. In a speed control mechanism for a metal working machine, a work support, a tool support, a tool mounted thereon, mechanism for effecting a relative rotating movement between the tool and said work including a motor, a motor field, an adjustable resistance for selecting any of a plurality of peripheral speeds for the rotated part, a second adjustable resistance dependent on the relative position of the tool and work for determining the angular rate of said rotating movement, additional resistance for modifying the effect of said adjustable resistances, said motor field, said adjustable resistances and said additional resistance being connected in a series multiple circuit and proportioned so that the effective rate of change of the total field resistance is regulated to maintain any peripheral speed substantially constant for all diameters of the work.

2. In a speed control mechanism for grinding wheels, a motor for driving the wheel, a motor field, an adjustable resistance for varying the motor field for selecting a plurality of different peripheral speeds for the wheel, a second adjustable resistance for varying the motor field for controlling the motor speed, means adjustable as the diameter of the wheel changes due to wear and dressing, for shifting said second adjustable resistance, additional resistance for modifying the effect of said adjustable resistances, said motor field, said adjustable resistances and said additional resistance being connected in a series multiple circuit and proportioned so that the effective rate of change of the total field resistance is regulated to maintain any selected peripheral speed substantially constant for all diameters of the wheel.

3. In a speed control mechanism for grinding wheels, a motor for driving the wheel, a motor field, an adjustable resistance for varying the motor field for selecting a plurality of different peripheral speeds for the wheel, a second adjustable resistance for varying the motor field for controlling the motor speed, means adjustable as the diameter of the wheel changes, due to wear and dressing, for shifting said second adjustable resistance, additional resistance, said motor field, said adjustable resistances and said additional resistance being connected in a series multiple circuit whereby the effective rate of change of the total field resistance is regulated to maintain any selected peripheral speed substantially constant for all diameters of the wheel, said second adjustable resistance having two independent ranges operable in succession as the diameter of the wheel changes, each of which will give a full range of motor speeds, and a switch for changing from one range to another.

4. In a speed control mechanism for grinding wheels, a motor for driving the wheel, a motor field, an adjustable resistance in series with the field of the motor for setting the motor speed to give a selected peripheral speed of the wheel, a second adjustable resistance in series with the field of the motor for controlling said motor speed, and a third resistance in parallel with said second resistance and the field winding and in series with the first adjustable resistance, and means adjustable as the diameter of the wheel changes due to wear and dressing for shifting said second adjustable resistance so as to maintain said selected peripheral speed substantially constant for all diameters of the wheel.

5. In a speed control mechanism for grinding wheels, a motor for driving the wheel, a motor field, an adjustable resistance in series with the field of the motor for setting the motor speed to give a selected peripheral speed of the wheel, a second adjustable resistance in parallel with said first adjustable resistance and in series with the motor field, additional resistances one in series with each of said adjustable resistances, and means adjustable as the diameter of the wheel changes due to wear and dressing for shifting said second adjustable resistance whereby the effective rate of change of the total field resistance is regulated to maintain any selected peripheral speed substantially constant for all diameters of the wheel.

6. In a speed control mechanism for grinding wheels, a motor for driving the wheel, a motor field, an adjustable resistance in series with the field of the motor for setting the motor speed to give a selected peripheral speed of the wheel, a second adjustable resistance in series with the field of the motor for controlling said motor speed, additional resistances for modifying the effect of said adjustable resistances, one in series with each of the adjustable resistances and in parallel with each other and proportioned so that the motor speed may be changed by increments which are a fixed percentage of the preceding speed.

7. In a speed control mechanism for grinding wheels, a motor for driving the wheel, a motor field, an adjustable resistance in series with the field of the motor for setting the motor speed to give a selected peripheral speed of the wheel, a second adjustable resistance in series with the field of the motor for controlling said motor speed, means for modifying the effect of said adjustable resistances on said motor field including additional resistance in series multiple relation with said adjustable resistances and said motor field and proportioned so that the motor speed may be changed by increments which are a fixed percentage of the preceding speed, and means adjustable as the diameter of the wheel changes due to wear and dressing for shifting said second adjustable resistance so as to maintain said selected peripheral speed substantially constant for all diameters of the wheel.

ROBERT S. ELBERTY, JR.